Patented Mar. 18, 1952

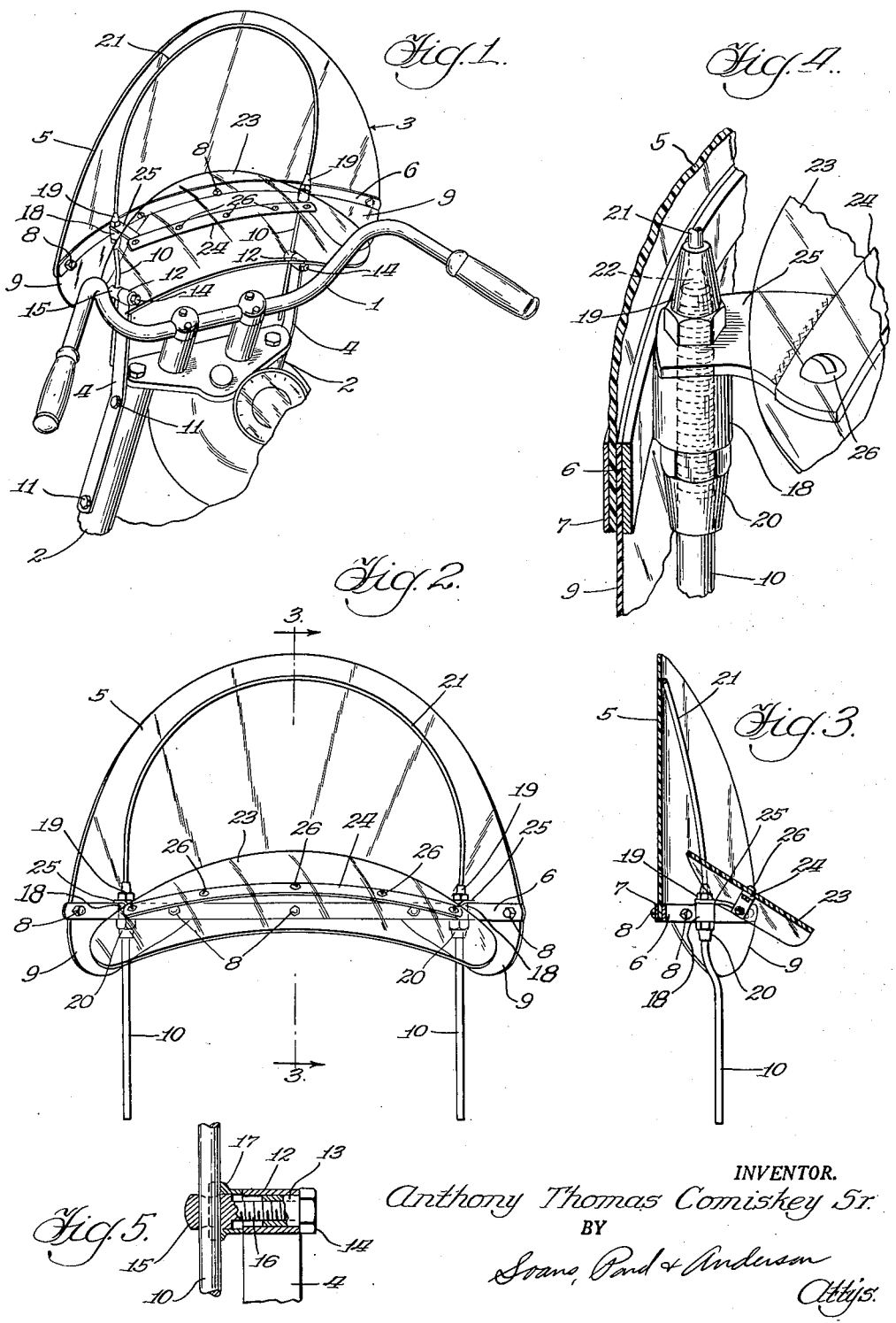

2,589,993

UNITED STATES PATENT OFFICE 2,589,993

WINDSHIELD FOR MOTORCYCLES AND SIMILAR VEHICLES

Anthony Thomas Comiskey, Sr., Chicago, Ill.

Application May 31, 1949, Serial No. 96,204

3 Claims. (Cl. 296—78.1)

This invention relates to screens or wind shields used for protecting the rider of a motorcycle or similar vehicle.

The objects of the invention are to provide a wind shield which will afford very effective protection against strong drafts against or cross the body and face of the rider of a motorcycle or like vehicle; to provide such a device of simple but nevertheless very durable and effective construction; to provide such a device which may be made of relatively small size but which will nevertheless provide highly effective protection; and, in general, it is the object of the invention to provide an improved wind shield of the character indicated.

Other objects and advantages of the invention will be understood by reference to the following specification and accompanying drawing in which there is illustrated a selected embodiment of the invention in a wind shield for attachment to a motorcycle or like vehicle.

In the drawing,

Fig. 1 is a perspective illustration of a wind shield embodying the present invention, and showing one manner in which the wind shield may be mounted on a motorcycle or like vehicle;

Fig. 2 is a rear elevation of the wind shield;

Fig. 3 is a vertical section on the line 3—3 of Fig. 2;

Fig. 4 is a fragmentary perspective illustrating certain details of construction on an enlarged scale, and Fig. 5 is a detail section through a mounting clamp.

In Fig. 1 there is illustrated the handle-bar 1 of a motorcycle, this handle-bar being suitably supported by the upper end of the front fork 2 of the vehicle. A wind shield 3 embodying the present invention is mounted on the fork 2 through the agency of suitable brackets, such as indicated at 4, 4. In another arrangement, not illustrated, the wind shield may be mounted on the handle-bar 1 through the agency of appropriate brackets which are well known in the art.

The wind shield 3 comprises a main screen section 5 of transparent plastic material, this section being preferably of clear, flexible, nonbreakable plastic sheeting. This upper shield section 5 has its lower margin secured to an arched frame bar 6 of metal. For this purpose the lower marginal portions of the screen 5 are interposed between the bar 6 and a clamping strap 7 which overlies the front of the shield and is secured to the frame bar 6 by a plurality of screws and nuts 8.

The general curved plane of the main shield part 5 is extended downwardly at its sides by means of wing tips 9 which have upper marginal portions interposed between the lower margin of the main member 5 and the strap member 6, and anchored in place by some of the fastening screws and nuts 8. These wing tips 9 may also be made of the same clear sheeting that is employed for making the main shield 5, but for more or less decorative purposes these extensions may be made of a distinctively colored, partially transparent or translucent material, or they even may be made of completely opaque material of any desired kind.

The main shield structure, comprising the member 5 and the extension tips 9, is normally secured to the motorcycle in a nearly vertical position or in a somewhat rearwardly upwardly tilted position.

For mounting the shield on the vehicle, suitable mounting rods 10, 10 are attached to the frame bar 6 and these mounting rods are adapted to be secured to the mounting brackets 4 or the like.

The mounting brackets 4 here shown, comprise strap-like members which may be bolted as indicated at 11, 11 to the outside of the fork arms 2, an upper portion of each of the brackets being bent forwardly relative to the length of the lower portion which is positioned against the fork sides.

At the upper end of the brackets 4 there is provided a cylindrical boss 12 which rotatably receives an axially tapped cylindrical member 13 having a nut head 14 which engages one end of the cylindrical boss 12.

The wind shield mounting rod 10 passes through an opening in a cylindrical member 15 which has a threaded stem 16 extending into and threadedly engaging the tapped member 13. A sleeve 17 surrounds the cylindrical member 15 intermediate the mounting rod 10 and the adjacent end of the cylindrical boss 12. By turning the end 14 and the tapped cylinder 13, the stem 16 and cylinder 15 will be drawn toward the bracket boss 12 to thereby clamp the mounting rod 10 against the sleeve 17 which is, in effect, an extension of the boss 12.

The mounting rods 10 are anchored to the frame bar 6 by having upper end portions of the rods passed through suitably bored out bosses 18 which are fastened to the rear face of the frame bar 6, the rods 10 being further clamped in place relative to the boss 18 by means of upper and lower clamping nuts 19 and 20.

As indicated in Fig. 4, the upper end portion of each rod 10 is screw threaded so that the nuts 19 and 20 may move toward each other on the screw threaded portion of the rod 10 and tightly clamp between them the boss 18 to thereby firmly secure the mounting rod 10 to the wind shield structure.

A rear brace bar 21 of inverted U-shaped form extends upwardly in continuation of the mounting rods 10 and provides support for the upper portion of the main shield member 5, thereby to resist excessive rearward flexing thereof incident to wind pressure in the normal use of the device. The lower ends of the arched brace bar 21 are secured to the mounting rods 10 through the agency of the upper clamping nuts 19 which have lower portions tapped to fit the threaded upper end portion of the mounting rod and upper portions bored out and counter-bored to receive the normal diameter of the brace bar 21 and flared end portions 22. The nut 20 is first applied to the rod 10 and the threaded end portion of the rod is then passed through the boss 18. The nuts 19 are applied to the ends of the brace 21 after which the ends of the brace are hammered to form the flared ends 22, and then the ends of the brace are brought into assembled relation to the ends of the rods 10 and nuts 19 screwed on the threaded ends of the rods so as to clamp the ends of the brace bar 21 against the upper ends of the respective rods. The nuts 20 are then adjusted toward the clamping nut 19 to thereby clamp the boss 18 between the nuts.

An auxiliary windshield member 23 is associated with the main member, this auxiliary member 23 being disposed rearwardly of the main member 5 and set at a rearwardly and downwardly extending angle substantially as shown in Figs. 2 and 3. This auxiliary member 23 is preferably formed of transparent plastic sheeting of the same kind that is employed for making the main member 5 although it is not essential that such transparent material be employed.

The auxiliary member 23 is arched transversely as best illustrated in Fig. 2, and it is supported in its arched condition and in its angular position by means of a cross brace 24 of strap metal. The opposite ends of the cross brace 24 are provided with laterally extending ears 25 which are suitably bored out and fitted over the upper end portions of the mounting rods 10 between the bosses 18 and the clamping nuts 19 so as to be securely clamped in place whereby the auxiliary shield 23 is fixed rigidly in place behind the main shield member 5.

The ears 25 may be formed integrally with the supporting bars 24 or welded or otherwise attached thereto. In this instance, they are made by welding separate ears to the end portions of the bars 24. The auxiliary screen element 23 may be secured to the supporting bar 24 by means of screw and nut fastenings indicated at 26, the screws passing through openings in the screen 23 and bar 24, and having heads seated on the upper surface of the screen and nuts tightened against the under surface of the supporting bar 24.

The angular disposition of the auxiliary member 23 is preferably about as illustrated in Fig. 3, namely about 30 degrees from the horizontal, but this angle may be adjusted to suit the particular preferences of the individual rider. Such adjustment may be made by bending the mounting ears 25. An adjustable connection may, of course, be embodied in the mounting ears 25 but for purposes of simplicity, a normally rigid but bendable ear arrangement is preferred and this has been found to be quite practical.

Most conventional motorcycle wind shields have a vertical dimension which is about the same or greater than the transverse width of the windshield, that is to say, they have a vertical dimension about twice that of the above described main windshield member. The described auxiliary member may be associated with such a conventional shield if the utmost in protection is desired. However, the substantially shortened main structure described, together with the described auxiliary member effectively protects the rider against drafts from below the shortened shield by reason of the wind-diverting effect of the auxiliary member 23. By reason of the angular arrangement of this auxiliary member 23, the wind flowing under the main shield member 5 is diverted downwardly around the legs of the rider and over the engine of the motorcycle on which it has an advantageous cooling effect which is supplemental to the main purpose of protecting the rider against the discomforts of heavy drafts.

As shown in Fig. 3, the auxiliary screen element 23 is spaced rearwardly from the main screen 5. This has the important effect of causing the downwardly directed air flow caused by the angular position of the auxiliary member 23, to have somewhat of an aspirator effect on the air flowing over and downwardly behind the main screen 5. Such air is drawn between the screen 5 and the auxiliary member 23 and directed downwardly as already indicated, thereby tending to relieve the rider from at least a part of the wind flowing over the top of the wind shield. The front or upper edge of the auxiliary screen 23 is curved as illustrated, so as to be approximately parallel to the back face of the main screen 5 and its extensions 9. The spacing of the front or upper edge of the auxiliary member 23 from the main member 5 and its wings 9, 9 is thereby made approximately uniform from side to side of the wind shield. A space of about one inch gives good results in most installations.

Various changes in the described details may be made while employing the principles of the invention. In some instances, the auxiliary member 23 may be manufactured and sold as a separate unit for application to other windshields. The described clamp-on mounting of the auxiliary shield is well adapted to such application but other forms of attachment may be employed. Where the auxiliary shield is made as a part of a main shield, the attachment between the two may be entirely independent of the attachment of the windshield to the motorcycle. Other modifications will also occur to those skilled in the art.

The vertically shortened main structure is significantly less costly to make than conventional full length shields because of the substantially reduced amount of material required to make them and because of the greater ease with which the smaller sheets of screen material can be handled. Also storage and packaging requirements are reduced.

I claim:

1. A wind shield for motorcycles and like vehicles, comprising a main screen, a frame bar rigidly secured to a lower marginal portion of said main screen, an auxiliary screen disposed rearwardly of said main screen and extending angularly rearwardly and downwardly therefrom, and means securing said auxiliary screen to said supporting bar of said main screen, said auxiliary screen having its front edge spaced from said main screen so as to permit air to flow between said main and auxiliary screens.

2. A windshield for motorcycles and like vehicles, comprising a main screen, an auxiliary screen associated with said main screen adjacent to the rear side thereof, said auxiliary screen extending angularly rearwardly and downwardly from a location spaced upwardly and rearwardly from the lower edge of said main screen, and means for normally fixedly maintaining said main and auxiliary screens in the aforesaid relationship.

3. A windshield for motorcycles and like vehicles, comprising a main screen, a frame bar secured to said main screen, a pair of mounting rods secured to and depending from said frame bar for facilitating mounting of the windshield on the vehicle, an auxiliary screen disposed rearwardly of and spaced from said main screen adjacent to but at least partially above the lower edge of said main screen, said auxiliary screen extending angularly downwardly and rearwardly from said main screen, and means secured to said auxiliary screen for attaching the same to said mounting rods.

ANTHONY THOMAS COMISKEY, Sr.

REFERENCES CITED

The following references are of record in the file of this patent:

UNITED STATES PATENTS

| Number | Name | Date |
| --- | --- | --- |
| 1,239,916 | Jose | Sept. 11, 1917 |
| 2,396,493 | Comiskey | Mar. 12, 1946 |
| 2,411,131 | Hanson | Nov. 12, 1946 |

FOREIGN PATENTS

| Number | Country | Date |
| --- | --- | --- |
| 531,137 | Great Britain | Dec. 30, 1940 |